April 3, 1934.  G. J. LOWRES  1,953,117
SPRING BRIDGE AND MOUNTINGS FOR EYEGLASSES
Filed Sept. 28, 1932
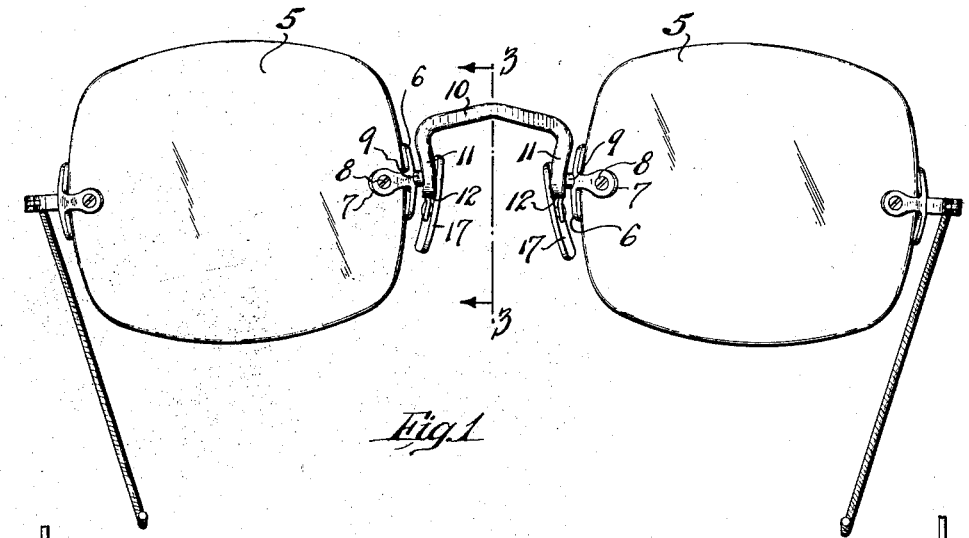
Fig.1
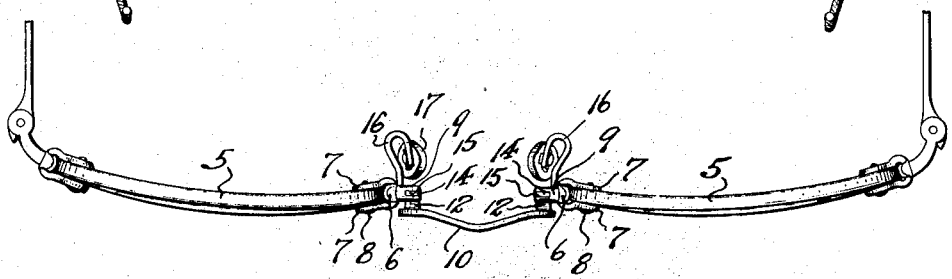
Fig.2
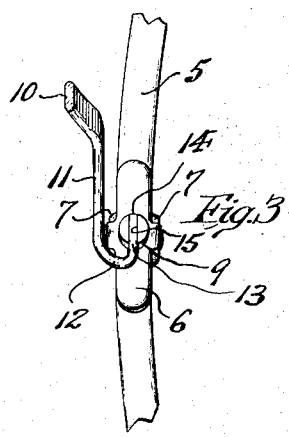
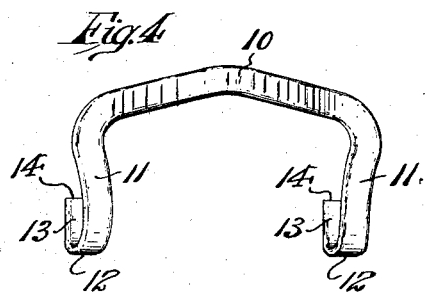
INVENTOR.
GEORGE J. LOWRES, DECEASED.
By SARAH C. LOWRES, EXECUTRIX.
By George D. Richards
ATTORNEY Patented Apr. 3, 1934

1,953,117

UNITED STATES PATENT OFFICE 1,953,117

SPRING BRIDGE AND MOUNTINGS FOR EYEGLASSES

George J. Lowres, deceased, late of Newark, N. J., by Sarah C. Lowres, executrix, Newark, N. J.

Application September 28, 1932, Serial No. 635,185

1 Claim. (Cl. 88—45)

This invention relates to improvements in spring bridge and mountings for eye-glasses; and the invention has reference, more particularly, to a semi-flexible nose bridge and means for connecting the same to and between the lenses of eye-glasses.

There have heretofore been provided forms of eye-glasses, both of the spectacle and pincenez types, in which a resilient or spring-like nose-bridge element is utilized to join in connected spaced relation the lenses thereof, the resilient action of such nose-bridge element being relied on to tensionally press the nose-gripping guards or pads into holding relation to the nose of the wearer. Usually the extremities of such spring bridge elements have been soldered to the posts of the lens straps, and it frequently occurs that the heat of the soldering operation draws the temper of the legs of the nose bridge to such an extent as to materially anneal or soften the same to the detriment of the resilient action desired in the functioning of the nose bridge. Furthermore, owing to the form of such nose bridge elements, as heretofore employed, whereby the same, when assembled with the eye glass lenses, were disposed substantially in the plane of said lenses, but a very limited scope of adjustment of the lenses for pupilary distance was possible of attainment.

It is the principal object of this invention to provide a novel form and assembled disposition of nose bridge element, whereby the effects of the soldering operation do not tend to draw the temper of or soften the bridge legs to the detriment of the spring action thereof; and, furthermore, to provide a form of spring bridge adopted to provide an efficient semi-flexible connection between the eye-glass lenses, while at the same time permitting the main body of the spring bridge to occupy a plane outwardly off-set relative to the plane of the lenses, to the end that a greater amplitude of adjustment of said lenses for pupilary distance is attainable.

Another object of this invention is to provide a stronger and more efficient connection between the ends of the spring bridge and the posts of the lens straps, to the end that breaking strains under the stresses of adjusting bends are avoided.

Other objects of this invention, not at this time more particularly enumerated, will be understood from the following detailed description thereof.

An illustrative embodiment of this invention is shown in the accompanying drawing, in which:—

Fig. 1 is a front face view of eye-glasses of the spectacle type, equipped with the novel semi-flexible or spring nose bridge according to this invention; Fig. 2 is a top edge view of the same; Fig. 3 is a vertical sectional view, taken on line 3—3 in Fig. 1, but drawn on an enlarged scale; and Fig. 4 is a perspective view of the novel spring nose bridge per se.

Similar characters of reference are employed in the above described views, to indicate corresponding parts.

Referring to said drawing, the reference character 5 indicates the eye-glass lenses, and 6 the straps which abut the inner sides of the peripheries thereof, said straps 6 having perforate ears or lugs 7 to embrace the faces of the lenses, and being arranged to receive the transverse fastening screws 8 which extend therethrough and through the lenses, so as to fixedly attach the latter to the straps 6. Projecting from the straps 6 are posts 9 to which the spring nose bridge and the nose guard or pad structures are affixed.

The novel semi-flexible or spring nose bridge comprises a flat strip of suitable metal shaped to provide the center arch portion 10 and legs 11 depending from the ends thereof and bent downwardly therefrom in face plane of the metallic strip forming these parts. The extremities of said legs 11 are turned rearwardly, as at 12, and then upwardly, as at 13, to provide rearwardly off-set and upturned anchor members 14.

The extremities of said posts 9 of the lens straps 6 are provided with diametrically disposed seating notches 15 in substantially vertical plane.

To assemble and unite the nose bridge in connecting relation to and between the lens straps 6, the anchor members 14 of the bridge legs 11 are inserted into the seating notches 15 of the strap posts 9 and then soldered, brazed or otherwise securely united thereto. Owing to the extension of the bridge legs formed by the up-turned anchor members 14, the heat utilized in the soldering or like attaching operations, is not sufficiently extended by conduction to the leg portions 11 per se to result in any material softening or drawing of the temper thereof, and consequently the desired tensional resiliency of the nose bridge and its leg portions is not impaired, and consequently the latter parts are not readily subject to accidental bending or like deformation in use, with resultant defeat of the operation thereof in tensionally pressing the nose guards or pads in gripping relation to the nose of the wearer.

The reference character 16 indicates the carrier arms, upon the free extremities of which are mounted, in any usual or desired manner, the nose guards or pads 17. Said carrier arms 16 are soldered or otherwise secured to or connected with the strap posts 9, and said carrier arms 16 may be of any desired shape.

It will be obvious that by swinging the outer ends of the lenses outwardly or forwardly that the connecting spring nose bridge will flex under such movement, while at the same time the nose guards or pads 17 will tend to move apart. This operation may be performed by the user of the eye-glasses when donning the eye glasses, so that when the nose guards or pads 17 are positioned at opposite sides of the wearer's nose, and the lenses thereupon released, the stored tension of the spring bridge will cause the same to return toward the normal initial position from which it has been flexed, thereby tending to move the nose guards or pads toward each other, and consequently into desired gripping relation to the sides of the wearer's nose.

Owing to the provision of the rearwardly offset anchor members 14 at the extremities of the nose bridge, the latter occupies a plane forwardly off-set relative to the plane of the lenses 5. This is of considerable advantage since it permits a wide latitude of adjustment of the lenses 5 for pupilary distance, especially when the requirements demand the positioning of the lenses unusually close together, since, in such case, the arch portion 10 of the nose bridge may even overlap the inner ends of the lenses, and thus not only avoid obstructing the movement of the lenses toward one another, but also avoid interference of the lenses with the desired flexing movements of the nose bridge in connection with the manipulation of the eye-glasses by the wearer.

As changes could be made in the above described construction and different embodiments of this invention could be made without departing from the scope thereof as defined in the following claim, it is intended that all matter contained in the above description or shown in the accompanying drawing shall be interpreted as illustrative and not in a limiting sense.

What is claimed is:

In eye glasses having lens straps respectively secured to the respective lenses at oppositely facing margins of the latter, posts projecting from said straps substantially in the plane of said lenses, nose pad elements connected with said posts, said posts having transverse seating notches extending in substantially vertical plane through the end portions thereof, and a spring bridge comprising a central arch portion having legs depending directly from the extreme ends thereof, the extremities of said legs being doubled back upon themselves to provide curved resilient yoke portions terminating in rearwardly off-set upstanding anchor members engaged and securely fixed in said seating notches, whereby said spring nose bridge is disposed in a plane forwardly off-set relative to the plane of said lenses.

SARAH C. LOWRES,
*Executrix of the Last Will and Testament of George J. Lowres, Deceased.*